(12) United States Patent
Dingli et al.

(10) Patent No.: US 11,568,687 B2
(45) Date of Patent: Jan. 31, 2023

(54) AUTOMATED VEHICULAR DAMAGE DETECTION

(71) Applicant: Pony AI Inc., Grand Cayman (KY)

(72) Inventors: Robert Dingli, Cupertino, CA (US); Peter G. Diehl, Shanghai (CN); Chen Yue Li, San Francisco, CA (US)

(73) Assignee: Pony AI Inc., Grand Cayman (KY)

( * ) Notice: Subject to any disclaimer, the term of this patent is extended or adjusted under 35 U.S.C. 154(b) by 482 days.

(21) Appl. No.: 16/671,042

(22) Filed: Oct. 31, 2019

(65) Prior Publication Data
US 2021/0134088 A1 May 6, 2021

(51) Int. Cl.
*G07C 5/08* (2006.01)
*G07C 5/00* (2006.01)
*B60Q 9/00* (2006.01)

(52) U.S. Cl.
CPC .......... *G07C 5/0816* (2013.01); *G07C 5/008* (2013.01); *G07C 5/085* (2013.01); *G07C 5/0808* (2013.01); *B60Q 9/008* (2013.01)

(58) Field of Classification Search
None
See application file for complete search history.

(56) References Cited

U.S. PATENT DOCUMENTS

| 7,729,829 | B2 | 6/2010 | Messih et al. | |
| 9,211,875 | B2 | 12/2015 | Harada | |
| 9,533,539 | B2 | 1/2017 | Eng | |
| 2004/0094912 | A1* | 5/2004 | Niwa | B60G 17/0165 |
| | | | | 280/5.518 |
| 2017/0358151 | A1* | 12/2017 | Koons | G07C 5/0808 |
| 2018/0194356 | A1* | 7/2018 | Richards | B60W 30/20 |
| 2018/0215400 | A1* | 8/2018 | Agrawal | B61L 15/0027 |
| 2019/0080529 | A1* | 3/2019 | Saylor | G07C 5/0816 |
| 2019/0235499 | A1* | 8/2019 | Kazemi | B60W 30/0956 |
| 2020/0271469 | A1* | 8/2020 | Willis | G07C 5/0808 |

* cited by examiner

*Primary Examiner* — James J Lee
*Assistant Examiner* — David Hatch
(74) *Attorney, Agent, or Firm* — Sheppard Mullin Richter & Hampton LLP

(57) ABSTRACT

Described herein are systems, methods, and non-transitory computer readable media for evaluating vibrational characteristics of a vehicle such as an autonomous vehicle and vibrational characteristics of a road surface in conjunction with one another to identify anomalous vehicle vibrational characteristics that may be indicative of potential damage to the structure of a vehicle. A baseline vibrational signature may be generated for a road segment based on sensor data received from multiple vehicles traversing the road segment. A vibrational signature may also be generated for a particular vehicle being evaluated based on real-time sensor data. If the vibrational signature for the vehicle deviates from the baseline vibrational signature for the road segment by more than a threshold amount, the vehicle may be deemed to be exhibiting anomalous vibrational characteristics indicative of potential vehicular damage. One or more actions in response thereto may then be taken such as automatically halting the vehicle.

13 Claims, 9 Drawing Sheets

AUTOMATED VEHICULAR DAMAGE DETECTION

The present invention relates generally to automated vehicular damage detection, and more particularly, in some embodiments, to automated detection of damage to a vehicular suspension system based on anomalous vibrational characteristics of the vehicle.

BACKGROUND

On-board sensors in a vehicle, such as an autonomous vehicle (AV), supplement and bolster the vehicle's field-of-view (FOV) by providing continuous streams of sensor data captured from the vehicle's surrounding environment. Sensor data can be used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board vehicle sensors can be broadly categorized into two types: active sensors that provide their own energy source for operation and passive sensors that rely on an external power source for operation. On-board sensors include, for example, cameras, light detection and ranging (LiDAR)-based systems, radar-based systems, Global Positioning System (GPS) systems, sonar-based sensors, ultrasonic sensors, accelerometers, gyroscopes, magnetometers, inertial measurement units (IMUs), and far infrared (FIR) sensors. Sensor data may include image data, reflected laser data, acceleration data, angular movement data, or the like. Real-time spatial information may be acquired near a vehicle using various on-board sensors located throughout the vehicle, which may then be processed to calculate various vehicle parameters and determine safe driving operations of the vehicle.

As a vehicle travels along a road surface, it may encounter defects in the road surface (e.g., potholes, bumps, etc.); obstructions (e.g., an unintended object on the road surface); intentionally placed impediments designed to regulate vehicle speed (e.g., speed bumps, rumble strips, etc.); or the like. These defects/obstructions can cause damage to a vehicle's structure such as its suspension system if, for example, a vehicle traverses or otherwise contacts them at too high a speed.

In the case of a human-operated vehicle, potential damage to a vehicle's structure can be identified through human observation. For example, if a vehicle operator begins to hear an unusual noise during operation of the vehicle or feel an excessive amount of vibration, she has the capability of pulling the vehicle over and performing further inspection. In the case of an AV, however, where human observation from a vehicle operator is not available, damage to a vehicle structure can go undetected, potentially leading to large-scale failure that could have been avoided if the damage had been detected at an earlier stage. Technical solutions that address the drawbacks of autonomous vehicle technology with respect to automated vehicular damage detection are described herein.

SUMMARY

Described herein are systems, methods, and non-transitory computer readable media for performing an automated determination of potential vehicular damage. In an example embodiment, a method for performing an automated determination of potential vehicular damage includes receiving real-time sensor data from one or more on-board sensors of a vehicle, where the sensor data is indicative of vibrational characteristics of the vehicle, and determining a road segment currently being traversed by the vehicle. The method further includes determining a baseline vibrational signature corresponding to the road segment and determining a vibrational signature for the vehicle based at least in part on the real-time sensor data. The method additionally includes determining that the vibrational signature for the vehicle deviates from the baseline vibrational signature by more than a threshold amount and, in response to such a determination, generating a vibrational anomaly alert. The method further includes initiating a response to the vibrational anomaly alert.

In another example embodiment of the invention, a system for performing an automated determination of potential vehicular damage includes at least one processor and at least one memory storing computer-executable instructions. The at least one processor is configured to access the at least one memory and execute the computer-executable instructions to perform a series of operations. In an example embodiment, the series of operations includes receiving real-time sensor data from one or more on-board sensors of a vehicle, where the sensor data is indicative of vibrational characteristics of the vehicle, and determining a road segment currently being traversed by the vehicle. The operations further include determining a baseline vibrational signature corresponding to the road segment and determining a vibrational signature for the vehicle based at least in part on the real-time sensor data. The operations additionally include determining that the vibrational signature for the vehicle deviates from the baseline vibrational signature by more than a threshold amount and, in response to such a determination, generating a vibrational anomaly alert. The operations further include initiating a response to the vibrational anomaly alert.

In another example embodiment of the invention, a computer program product for automated determination of potential vehicular damage is disclosed. The computer program product includes a non-transitory computer-readable medium readable by a processing circuit, where the non-transitory computer-readable medium stores instructions executable by the processing circuit to cause a method to be performed. In an example embodiment, the method includes receiving real-time sensor data from one or more on-board sensors of a vehicle, where the sensor data is indicative of vibrational characteristics of the vehicle, and determining a road segment currently being traversed by the vehicle. The method further includes determining a baseline vibrational signature corresponding to the road segment and determining a vibrational signature for the vehicle based at least in part on the real-time sensor data. The method additionally includes determining that the vibrational signature for the vehicle deviates from the baseline vibrational signature by more than a threshold amount and, in response to such a determination, generating a vibrational anomaly alert. The method further includes initiating a response to the vibrational anomaly alert.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
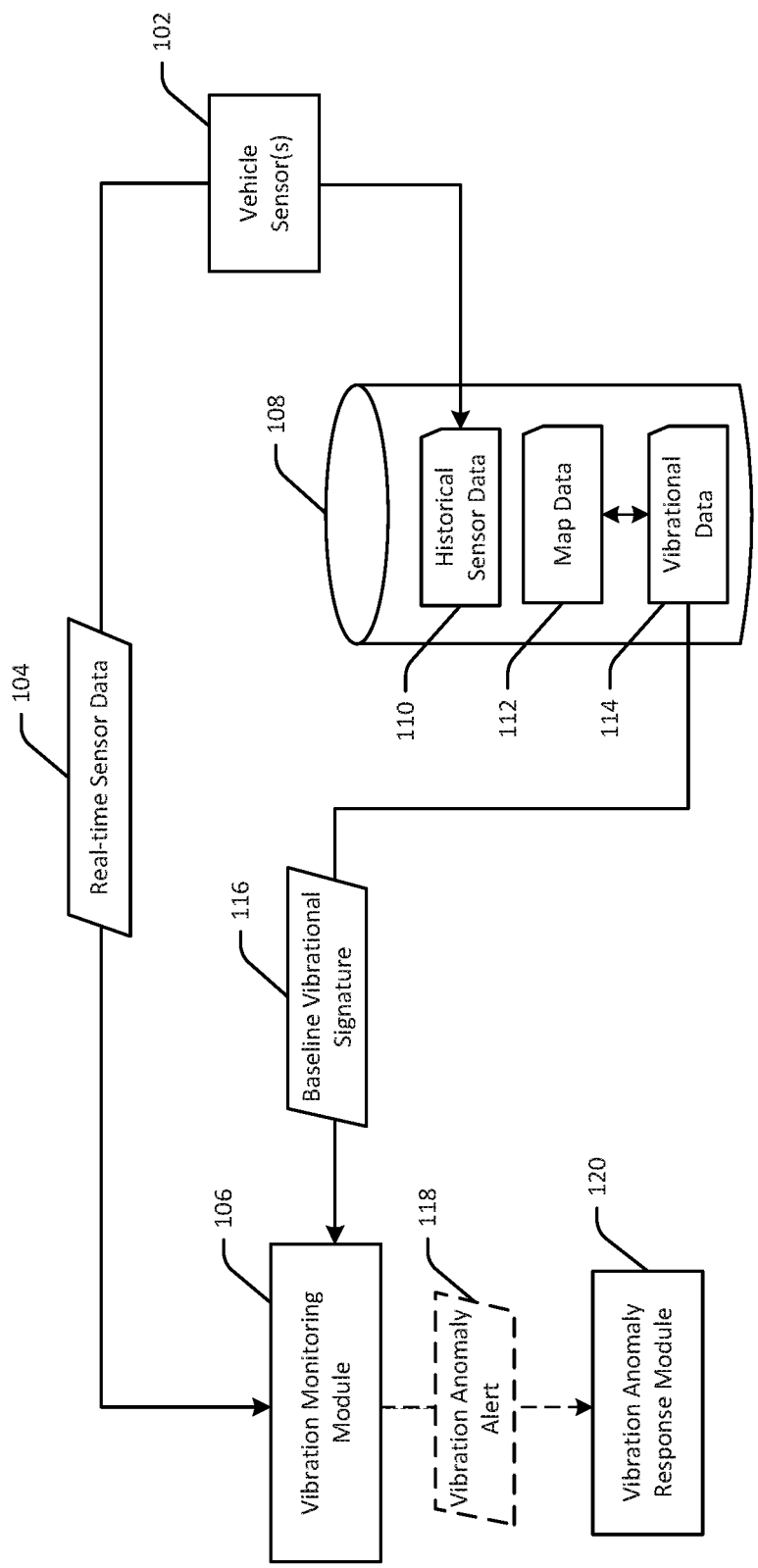
FIG. 1 is a hybrid data flow and block diagram illustrating automated vehicular damage detection based on vibrational characteristics of a vehicle in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle, a driverless vehicle, etc.) can have a myriad of on-board sensors. Such sensors can be disposed on an exterior or in an interior of a vehicle and can include, without limitation, LiDAR sensors, radars, cameras, microphones, GPS receivers, sonar-based sensors, ultrasonic sensors, IMUs, accelerometers, gyroscopes, magnetometers, FIR sensors, and so forth. Such sensors play an important role in the functioning and operation of an autonomous or driverless vehicle. For example, LiDARs can be utilized to detect and identify objects (e.g., other vehicles, road signs, pedestrians, buildings, etc.) in an environment around a vehicle. LiDARs can also be utilized to determine relative distances of the objects in the environment. As another non-limiting example, radars can be utilized in connection with collision avoidance, adaptive cruise control, blind spot detection, assisted parking, and so forth. As yet another non-limiting example, cameras can be utilized to recognize, interpret, and/or identify objects captured in images or visual cues of the objects. As still another non-limiting example, an IMU may detect abnormal road surface conditions or obstructions such as bumps or potholes in a road. Data collected from these sensors can be processed and supplied, as inputs, to algorithms configured to make various autonomous driving decisions including decisions relating to when and the extent to which to accelerate, decelerate, change direction, or the like.

Various embodiments of the invention overcome technical problems specifically arising in the realm of computer-based technology, and more specifically, in the realm of autonomous vehicle technology. According to various example embodiments of the invention, vibrational characteristics of a vehicle such as an autonomous vehicle (AV) and vibrational characteristics of a road surface can be used in conjunction with one another to identify potential damage to the structure of a vehicle and take one or more actions in response thereto. In accordance with example embodiments of the invention, after potential damage to a vehicle structure such as a suspension system of a vehicle is determined in an automated manner, various responses may be taken such as automatically bringing an AV to a stop at a safe location; sending a communication to an emergency assistance provider (e.g., police, fire, ambulatory, and/or towing service provider) to initiate an emergency response; performing additional diagnostics on the suspected damaged structure; and so forth.

In example embodiments, various on-board vehicle sensors may capture sensor data relating to the vehicle's operation. Such sensors may include, for example, one or more IMUs. An IMU is an electronic device that measures and reports an object's specific force, angular rate, and/or orientation using a combination of accelerometers, gyroscopes, and optionally, magnetometers. Accelerometers of an IMU detect linear acceleration and gyroscopes of an IMU detect rotational rate. Some IMUs also include one or more magnetometers to provide a heading reference. In an example configuration, an IMU may include a respective accelerometer, gyroscope, and magnetometer for each axis of a vehicle's three axes: pitch, roll, and yaw. In certain example embodiments, an IMU may be incorporated into a GPS device to provide an IMU-enabled GPS device. An IMU-enabled GPS device is capable of providing navigational data even when GPS signals are unavailable such as in tunnels, inside buildings, or when electronic interference is present.

In example embodiments, sensor data captured by various on-board vehicle sensors may be indicative of vibrational characteristics of a vehicle as it travels along a road surface. For instance, vehicle acceleration data, rotational data, and/or orientation data embodied in sensor data captured by an IMU on-board a vehicle may indicate vibrational characteristics of the vehicle. Vibrational characteristics of a vehicle may include, for example, magnitude of vibration (also referred to herein as a level or amount of vibration), frequency of vibration, or the like. Further, in example embodiments, changes in the vibrational characteristics of a vehicle can be determined based on changes in the data captured by an IMU over a period of time. More specifically, in example embodiments, a vibrational signature can be determined for a vehicle based on a continuous stream of real-time sensor data received from one or more vehicle IMUs. In example embodiments, a vibrational signature for a vehicle may be indicative of an instantaneous level of vibration of the vehicle; a level of vibration of the vehicle over a period of time; a frequency of vibration (e.g., a rate of change in the level of vibration of the vehicle over time); and so forth.

In example embodiments, a vibrational signature for a vehicle may be determined using data from sensors other than or in addition to IMUs. For instance, in example embodiments, audio data from one or more microphones may be used alone or in conjunction with IMU sensor data and/or other sensor data to generate a vibrational signature for a vehicle. For instance, in example embodiments, a vibrational level of a vehicle, a vibrational frequency of the vehicle, or the like, can be determined based on a decibel level and/or tonal characteristics of audio data captured, for example, by one or more microphones or other audio capturing devices provided on-board a vehicle. Once determined, these vibrational parameters can be used to construct a vibrational signature for the vehicle.

In example embodiments, a vibrational signature can also be determined for a road segment. More specifically, in example embodiments, sensor data captured from on-board sensors (e.g., IMUs, microphones, etc.) of a plurality of vehicles can be aggregated to generate aggregated sensor data indicative of vibrational characteristics of the plurality of vehicles as they traverse a road segment. A baseline vibrational signature for the road segment can then be determined based on the aggregated sensor data. In example embodiments, the baseline vibrational signature for a road segment may be indicative of a cumulative or an average level of vibration caused by defects, impediments, obstructions, and/or overall road surface quality of the road segment, as reflected by the vibrational characteristics of multiple vehicles traversing the road segment, where such vibrational characteristics are embodied in the sensor data received from IMUs, microphones, or the like of the vehicles. In example embodiments, a different baseline vibrational signature may be generated for each road segment that reflects the particular vibrational characteristics of that road segment. Further, a baseline vibrational signature for a road segment may be stored in association with corresponding map data for that road segment. As such, according to example embodiments, a baseline vibrational signature for a road segment can be accessed by accessing the corresponding map data for that road segment.

In example embodiments, a vibrational signature for a vehicle and a baseline vibrational signature for a road segment along which the vehicle is travelling may be compared to determine if the vehicle is exhibiting anomalous vibrational characteristics that are outside of the range of expected vibrational behavior of the vehicle on that particular road segment, and thus, potentially indicative of vehicular damage such as damage to the vehicle's suspension system. More specifically, in example embodiments, a vibrational signature for a vehicle may be determined from real-time sensor data captured by one or more on-board vehicle sensors, where the real-time sensor data is indicative of vibrational characteristics of the vehicle as it travels along a particular road segment. A baseline vibrational signature for the road segment—which may have previously been generated offline from aggregated sensor data received from a multiple vehicles—may be retrieved. As previously noted, the baseline vibrational signature may be indicative of a cumulative amount of vibration on the road segment, an average amount of vibration on the road segment, or some other metric representative of vibrational characteristics of the road segment. In example embodiments, as long as the vibrational signature for the vehicle does not deviate from the baseline vibrational signature for the road segment by more than a threshold amount, it may be determined that the vehicle is exhibiting vibrational behavior within a normal operating range that is not indicative of potential damage to vehicular structure.

If, however, it is determined that the vibrational signature for the vehicle deviates from the baseline vibrational signature for the road segment by more than a threshold amount—and thus that the vehicle is exhibiting anomalous vibrational behavior in relation to the particular road segment it is traveling on—an automated vibrational anomaly alert may be generated. Various responses may then be initiated in response to the vibrational anomaly alert. For instance, in example embodiments, an on-board processing unit of an AV may utilize a GPS device, and optionally third-party data such as traffic data, weather data, or the like, to identify a safe location to halt the vehicle. Once identified, the processing unit may initiate a braking operation to bring the vehicle to a stop at the determined location. In addition, in example embodiments, a communication may be sent to an emergency services provider such as a police department, a fire department, an ambulatory services provider, a vehicle assistance provider (e.g., a towing service), or the like to initiate an emergency response. Upon receiving the communication (which may include an identification of a location of the vehicle), an emergency services provider may respond to the location of the vehicle to provide emergency response services which may include, for example, performing diagnostics on the vehicle to ascertain any potential vehicular damage, providing assistance to occupants of the vehicle, relocating the vehicle to another location (e.g., an automotive repair shop) for additional evaluation/diagnostics, or the like. It should be appreciated that the above examples of measures that may be taken in response to a vibrational anomaly alert are merely illustrative and not exhaustive.

Example embodiments of the invention provide technical solutions to technical problems associated with autonomous vehicle technology as it relates to vehicular damage detection and evaluation. In particular, example embodiments of the invention provide a technical solution to the technical problem of failure to detect damage to vehicular structure in a timely manner. Autonomous vehicles suffer from this technical problem due to the inability to rely on human observation from a vehicle operator. More specifically, because autonomous vehicles do not have a human vehicle operator, and thus, cannot rely on human observation to identify potential vehicular issues at an early stage, damage to a vehicle's structure can go undetected until the damage becomes potentially catastrophic to operation of the vehicle.

Example embodiments of the invention provide a technical solution to this problem that is rooted in computer-based technology. Specifically, example embodiments of the invention provide a technical solution in the form of utilizing and relying on sensor data from on-board vehicle sensors that is indicative of vibrational characteristics of a vehicle as well as vibrational characteristics of a road segment to generate corresponding vibrational signatures. These vibrational signatures—one for the vehicle which may be generated based on real-time sensor data and a baseline signature associated with the road segment which may be generated based on aggregated sensor data from multiple vehicles—may then be compared to determine whether the vehicle is exhibiting anomalous vibrational characteristics, in which case, various automated response measures may be taken. Thus, example embodiments of the invention provide a technical solution to the aforementioned technical problem in the form of algorithmic processing that is performed by an autonomous vehicle and that relies on sensor data from sensors on-board the autonomous vehicle from which vibrational characteristics can be gleaned. As such, the technical solution provided by example embodiments of the invention is necessarily rooted in computer-based autonomous vehicle technology.

Figure 3:
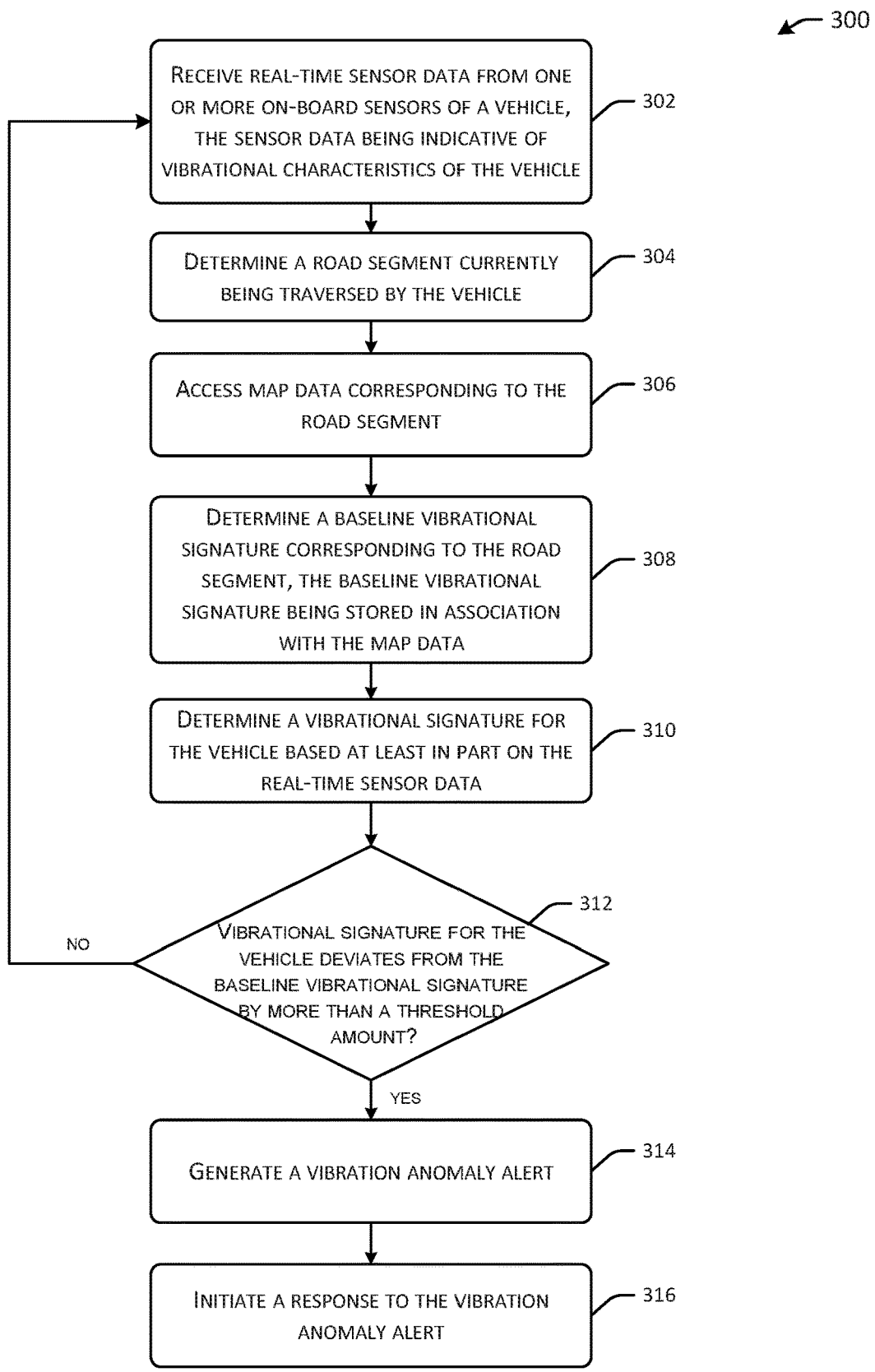
FIG. 3 is a process flow diagram of an illustrative method for automated vehicular damage detection based on vibrational characteristics of a vehicle in accordance with an example embodiment of the invention.

FIG. 1 is a hybrid data flow and block diagram illustrating automated vehicular damage detection based on vibrational characteristics of a vehicle in accordance with an example embodiment of the invention. FIG. 3 is a process flow diagram of an illustrative method 300 for automated vehicular damage detection based on vibrational characteristics of a vehicle in accordance with an example embodiment of the invention. FIGS. 1 and 3 will be described in conjunction with one another hereinafter.

Each operation of any method described herein can be performed by one or more of the program modules or the like depicted in FIG. 1, 2A-2C, or 7, whose operation will be described in more detail hereinafter. These program modules can be implemented in any combination of hardware, software, and/or firmware. In certain example embodiments, one or more of these program modules can be implemented, at least in part, as software and/or firmware modules that include computer-executable instructions that when executed by a processing circuit cause one or more operations to be performed. In example embodiments, these program modules may be customized computer-executable logic implemented within a customized computing chip such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 3 in conjunction with FIG. 1, at block 302 of the method 300, a vibration monitoring module 106 may receive real-time sensor data 104 from one or more on-board sensors 102 of a vehicle. In example embodiments, the vehicle may be an autonomous vehicle, a driverless vehicle, or the like; however, embodiments of the invention are not limited to only these types of vehicles and may include human operated vehicles. The vibration monitoring module 106 may include any combination of software, hardware, and/or firmware. In example embodiments, the vibration monitoring module 106 may be implemented as customized logic of a customized computing device or chip such as an ASIC, FPGA, or the like, which may be an embedded device of the vehicle. While example embodiments of the invention may be described herein in connection with a vibration monitoring module 106 that resides and executes on-board a vehicle, it should be appreciated that processing described as being performed by the vibration monitoring module 106 may, in alternative example embodiments, be performed remotely from the vehicle, with inputs received from on-board devices of the vehicle (e.g., sensor data from on-board vehicle sensors) and outputs provided to one or more processing units of the vehicle. The real-time sensor data 104 may be data from which vibrational characteristics/behavior of the vehicle can be determined. The vehicle sensor(s) 102 may include one or more IMUs, one or more microphones, or any other sensor that captures data indicative of vibrational characteristics of the vehicle.

At block 304 of the method 300, the vibration monitoring module 106 may determine a road segment that is currently being traversed by the vehicle. For instance, in example embodiments, the vibration monitoring module 106 may obtain a current location of the vehicle from a GPS device of the vehicle. Then, at block 306 of the method 300, the vibration monitoring module 106 may access map data 112 that corresponds to the current location of the vehicle. The map data 112 may be stored in one or more datastores 108 that are accessible by the vibration monitoring module 106. In certain example embodiments, the datastore(s) 108 may reside on data storage that is local to the vehicle. In other example embodiments, the datastore(s) 108 may reside on data storage that is remote to the vehicle and accessible by the vibration monitoring module 106 via a network connection.

In example embodiments, the vibration monitoring module 106 may access one or more portions of the map data 112 that correspond to a road segment that includes the determined location of the vehicle. For example, map data may have an underlying grid structure and may be stored and retrievable in data blocks corresponding to grid elements of the grid structure. In example embodiments, the portion of the map data 112 that encompasses the road segment that includes the vehicle's current location may be fully contained in a single grid element, and thus, may be retrievable as a single data block, or may cover multiple grid elements, and thus, may require retrieval of multiple data blocks.

At block 308 of the method 300, the vibration monitoring module 106 may determine a baseline vibrational signature 116 corresponding to the road segment that includes the determined current location of the vehicle. In example embodiments, vibrational data 114 may be stored in association with the map data 112 in the datastore(s) 108. The vibrational data 114 may include multiple baseline vibrational signatures, each of which corresponds to a respective road segment represented in the map data 112. The vibrational data 114, or more specifically, each baseline vibrational signature contained therein may be linked to a corresponding road segment represented in the map data 112. For instance, in example embodiments, the map data 112 may be labeled or tagged to identify the various road segments included in the map data 112. Each such label or tag may then be linked to a corresponding baseline vibrational signature for that road segment. Thus, in example embodiments, the vibration monitoring module 106 may locate, within the map data 112, the appropriate road segment that includes the vehicle's current location, and may then utilize the label or tag assigned to the road segment to identify the corresponding baseline vibrational signature 116.

The example method 300 assumes that the baseline vibrational signature 116 for the road segment that includes the vehicle's current location has already been generated and stored in association with the corresponding portion of the map data 112. An illustrative method 500 for generating a baseline vibrational signature for a road segment will be described hereinafter in reference to FIG. 5. The illustrative method 500 will be further described in reference to FIGS. 2A-2C, which schematically illustrate generation of different baseline vibrational signatures for different road segments in accordance with example embodiments of the invention, and more specifically, in reference to the example scenario of FIG. 2A.

Figure 2A:
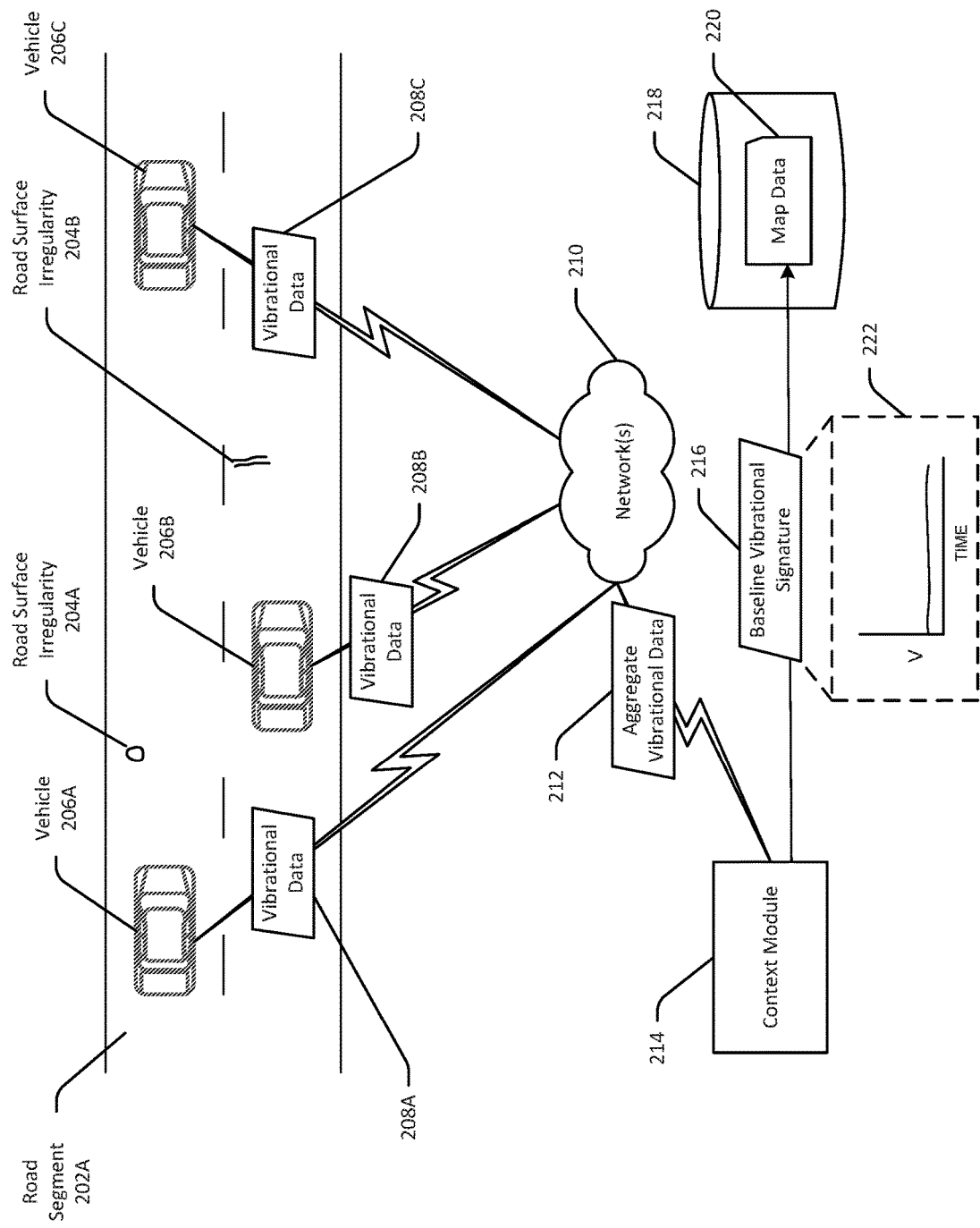
FIG. 2A schematically illustrates generation of a baseline vibrational signature for a road segment based on aggregate vibrational sensor data received from multiple vehicles in accordance with an example embodiment of the invention.

FIG. 2A depicts an example scenario in which a plurality of vehicles 206A, 206B, 206C are traversing a road segment 202A. The road surface may contain various road surface irregularities including, for example, a road surface irregularity 204A and a road surface irregularity 204B. The road surface irregularities 204A and 204B may include, without limitation, any of a variety of types of road surface defects such as potholes, bumps, ridges, depressions, or the like. Each of the plurality of vehicles 206A, 206B, 206C may be equipped with respective on-board sensors including any of a variety of sensors configured to capture data indicative of vibrational characteristics of the vehicles 206A, 206B, 206C as they traverse the road segment 202A. Such on-board sensors may include, without limitation, IMUs, accelerometers, gyroscopes, magnetometers, microphones, or any other types of sensor capable of capturing data indicative of vibrational characteristics.

Figure 5:
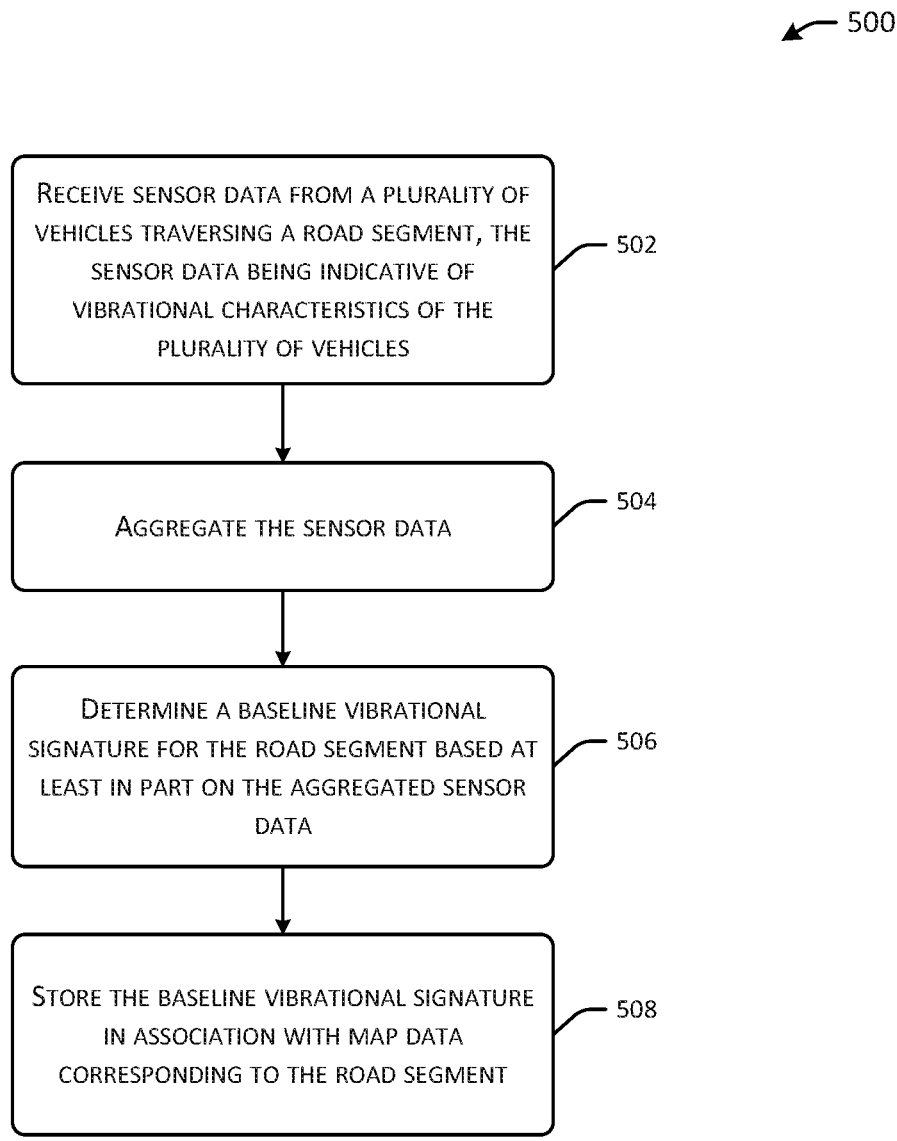
FIG. 5 is a process flow diagram of an illustrative method for generating a baseline vibrational signature for a road segment based on aggregate vibrational sensor data received from multiple vehicles in accordance with an example embodiment of the invention.

Referring now to FIG. 5 in conjunction with FIG. 2A, at block 502 of the method 500, a context module 214 (which may reside and execute as part of an on-board processing unit of a vehicle or may reside and execute on a remote server communicatively coupled to an on-board processing unit of a vehicle via one or more network(s) 210) may receive respective sensor data 208A, 208B, 208C from each of the plurality of vehicles 206A, 206B, 206C, or more specifically, from respective on-board sensors of each of the plurality of vehicles 206A, 206B, 206C. The term vibrational data may be used herein to describe any form of sensor data that is indicative of vibrational characteristics of a vehicle as it traverses a road segment. In example embodiments, the context module 214 may receive the respective vibrational data 208A, 208B, 208C from each of the plurality of vehicles 206A, 206B, 206C via the network(s) 210, which may include any combination of public and/or private networks.

At block 504 of the method 500, the context module 214 may aggregate the respective vibrational data 208A, 208B, 208C to generate aggregated vibrational data 212. In example embodiments, aggregating the vibrational data 208A, 208B, 208C may include, without limitation, sensor data fusion, data interpolation, data redundancy elimination, or any other form of data aggregation or manipulation. Then, at block 506 of the method 500, the context module 214 may determine a baseline vibrational signature 216 for the road segment 202A based at least in part on the aggregated vibrational data 212. At block 508, the context module 214 may store the baseline vibrational signature 216 in association with corresponding map data 220 in one or more datastores 218. More specifically, the context module 214 may store the baseline vibrational signature 216 such that it is linked to the corresponding road segment 202A within the map data 220.

It should be appreciated that, although three vehicles are illustratively depicted in FIG. 2A, any number of vehicles may traverse the road segment 202A and provide corresponding vibrational data to be used in constructing the baseline vibrational signature 216. In certain example embodiments, the greater the number of vehicles from which vibrational data is received and aggregated and used as the basis, at least in part, for generating a baseline vibrational signature, the greater the accuracy of the baseline vibrational signature in representing an expected baseline amount of vibration to be experienced by any given vehicle as it traverses a corresponding road segment.

An example schematic representation 222 of the baseline vibrational signature 216 is depicted in FIG. 2A. The schematic representation 222 depicts the baseline vibrational signature 216 as a continuous function of a vibrational metric in relation to time. For instance, the schematic representation 222 may be indicative of an instantaneous average/baseline amount of vibration that is exhibited by vehicles that traverse the road segment 202A over a period of time, where the average/baseline amount of vibration is correlated to a number, type, and/or magnitude of road surface irregularities (e.g., irregularities 204A, 204B) present on a road surface of the road segment 202A. In example embodiments, other metrics indicative of vibrational characteristics of vehicles traversing the road segment 202A can be gleaned from the schematic representation 222 of the baseline vibrational signature 216. For instance, the area under the curve in the schematic representation 222 may be indicative of a cumulative amount of vibration experienced by vehicles traversing the road segment 202A over a period of time. It should be appreciated that the schematic representation 222 is merely illustrative and not exhaustive, and that the baseline vibrational signature 216 can be embodied in alternative representations. As a general matter, a baseline vibrational signature for a road segment is indicative of a baseline amount of vibration expected to be experienced by a vehicle as it traverses the road segment due to the composition and/or distribution of road surface irregularities present on the road segment 202A.

Figure 2B:
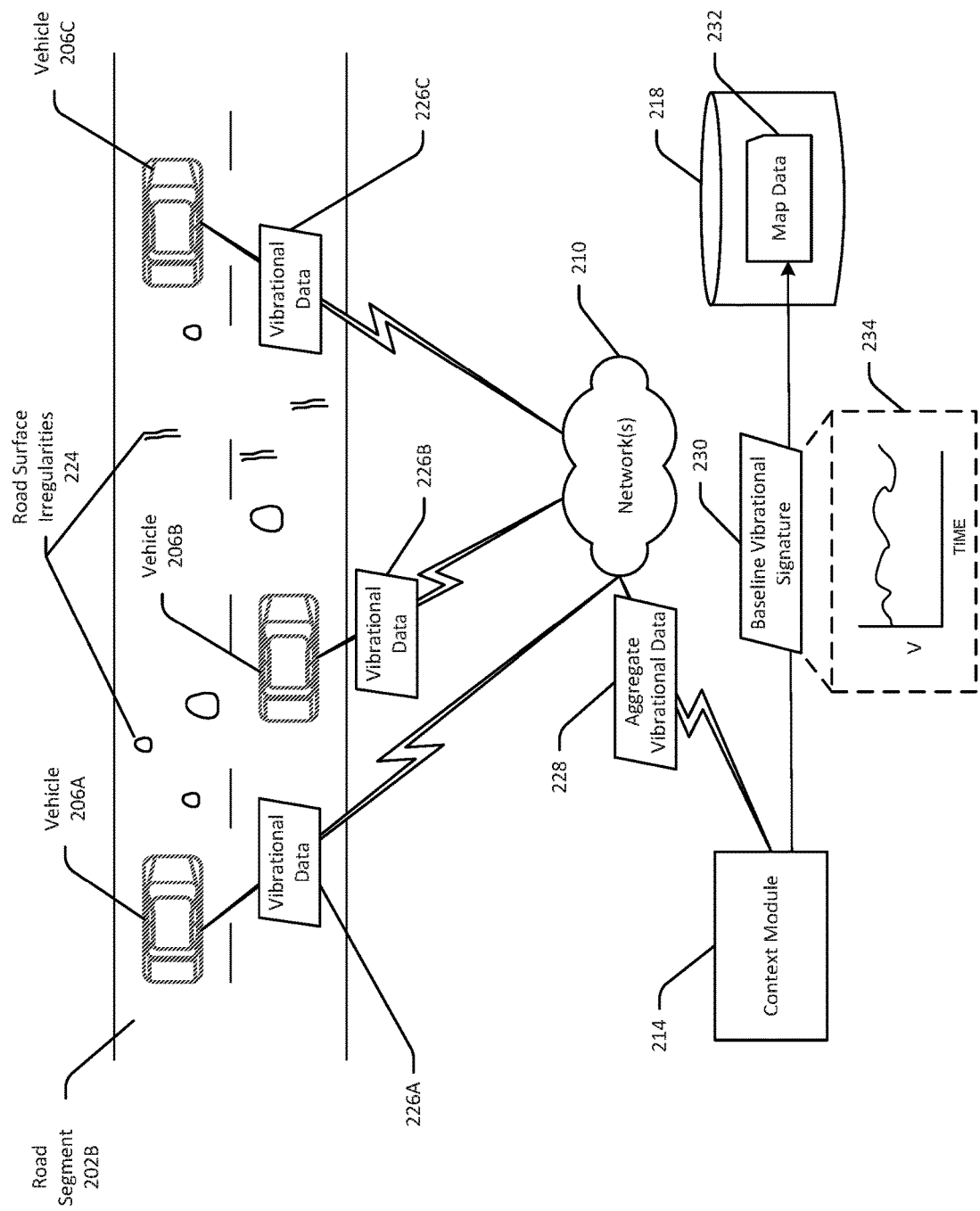
FIG. 2B schematically illustrates generation of a baseline vibrational signature for a road segment based on aggregate vibrational sensor data received from multiple vehicles in accordance with another example embodiment of the invention.

In example embodiments, a unique baseline vibrational signature may be generated for each road segment, where each baseline vibrational signature represents the expected vibrational characteristics of vehicles traversing a corresponding road segment. FIG. 2B depicts the generation of a different baseline vibrational signature for a different road segment than that depicted in FIG. 2A. As depicted in FIG. 2B, the plurality of vehicles 206A, 206B, 206C may now be traversing a different road segment—road segment 202B. Road segment 202B may include a greater number and/or magnitude of road surface irregularities 224 than road segment 202A of FIG. 2A. The magnitude of a road surface irregularity may refer to the amount of vibration the road surface irregularity is expected to generate in an average-sized vehicle traveling within a predetermined range of speeds (e.g., plus or minus 5 miles per hour from the speed limit).

As depicted in FIG. 2B, on-board sensors of the vehicles 206A, 206B, 206C may capture and send respective vibrational data 226A, 226B, 226C to the context module 214 via the network(s) 210. In accordance with the example method 300, the context module 214 may aggregate the respective vibrational data 226A, 226B, 226C to generate aggregated vibrational data 228. In example embodiments, the context module 214 may then generate a baseline vibrational signature 230 based at least in part on the aggregated vibrational data 228 and store the baseline vibrational signature 230 in association with corresponding map data 232 in the datastore(s) 218.

An example schematic representation 234 of the baseline vibrational signature 230 is shown in FIG. 2B. The schematic representation 234 illustrates a larger instantaneous average/baseline amount of vibration exhibited by the vehicles 206A, 206B, 206C as they traverse the road segment 202B over a period of time as compared to road segment 202A. Because the average/baseline amount of vibration may be correlated to a number, type, and/or magnitude of road surface irregularities present on a road surface of a road segment, the schematic representation 234 illustrates that the road segment 202B generates a larger average/baseline vibration in vehicles than the road segment 202A by virtue of having a greater number, type, and/or magnitude of road surface irregularities. In addition, the area under the curve in the schematic representation 234 is greater than the area under the curve in the schematic representation 222, indicating that the cumulative amount of vibration experienced by vehicles traversing the road segment 202B over a period of time is greater than the cumulative amount of vibration experienced on road segment 202A. Moreover, the schematic representation 234 illustrates a more random vibrational variation in the baseline vibrational signature 230 than in the baseline vibrational signature 216 of FIG. 2A, which may be a result of the increased number and/or magnitude of road surface irregularities 224 present on the road segment 202B and a more varied distribution of such irregularities as compared to the road segment 202A.

Figure 2C:
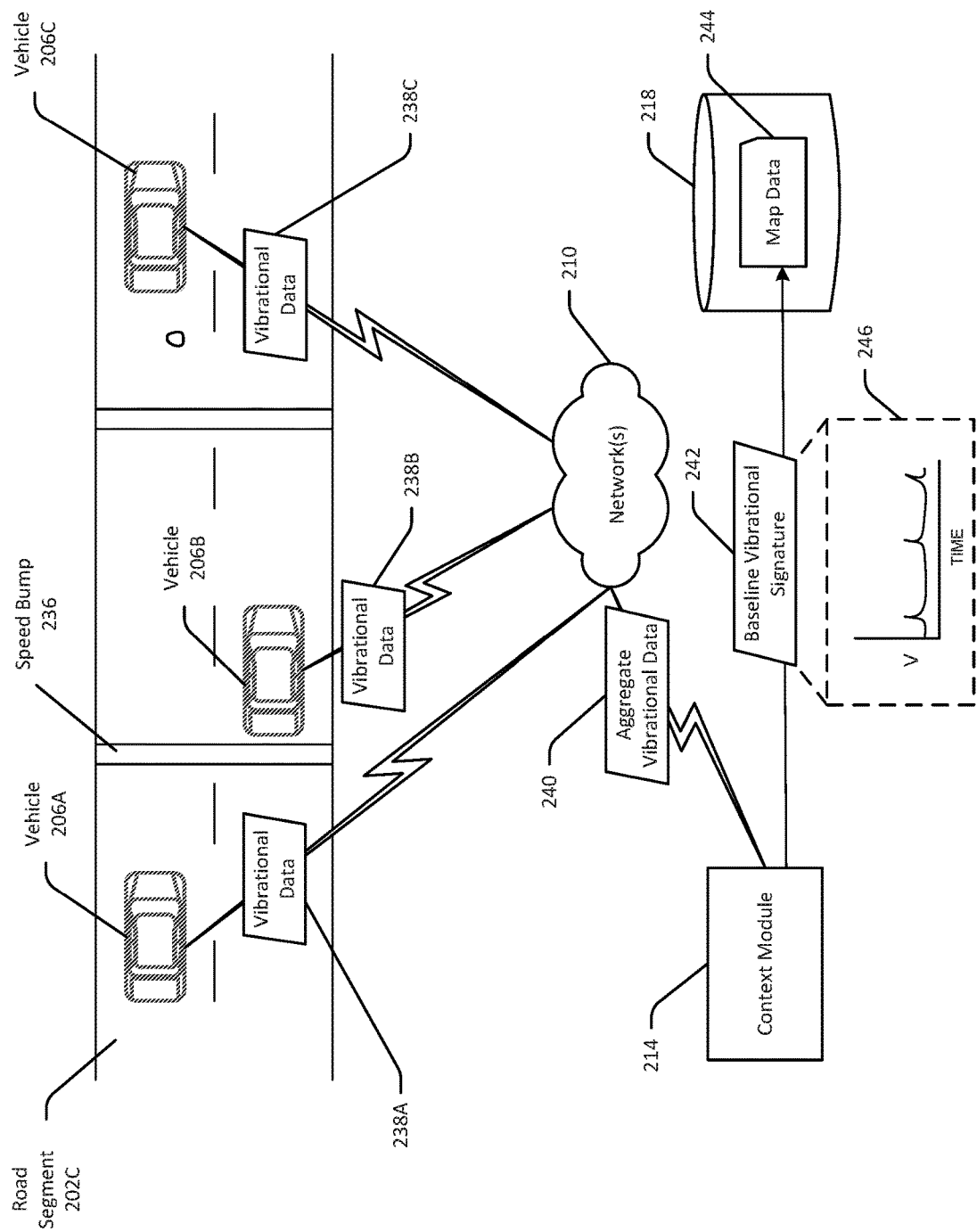
FIG. 2C schematically illustrates generation of a baseline vibrational signature for a road segment based on aggregate vibrational sensor data received from multiple vehicles in accordance with yet another example embodiment of the invention.

FIG. 2C depicts the generation of yet another baseline vibrational signature for a different road segment than those depicted in FIGS. 2A and 2B. As depicted in FIG. 2C, the plurality of vehicles 206A, 206B, 206C may now be traversing yet another road segment—road segment 202C. Road segment 202C may include a limited number of road surface irregularities as compared to the road segment 202B, for example. However, the road segment 202C may include intentionally placed impediments such as speed bumps 236 that are positioned at a regular interval on the road segment 202C in order to regulate vehicle speed.

As depicted in FIG. 2C, on-board sensors of the vehicles 206A, 206B, 206C may capture and send respective vibrational data 238A, 238B, 238C to the context module 214 via the network(s) 210. In accordance with the example method 300, the context module 214 may aggregate the respective vibrational data 238A, 238B, 238C to generate aggregated vibrational data 240. In example embodiments, the context module 214 may then generate a baseline vibrational signature 242 based at least in part on the aggregated vibrational data 240 and store the baseline vibrational signature 242 in association with corresponding map data 244 in the datastore(s) 218.

An example schematic representation 246 of the baseline vibrational signature 242 is shown in FIG. 2C. The schematic representation 246 illustrates a generally comparable instantaneous average/baseline amount of vibration for the vehicles 206A, 206B, 206C as they traverse the road segment 202C over a period of time as compared to road segment 202A, except for periodic perturbations in the average/baseline amount of vibration. These periodic perturbations are representative, for example, of increased vibration experienced by the vehicles 206A, 206B, 206C as they traverse the speed bumps 236 that are positioned at regularly spaced intervals. While speed bumps 236 are illustratively depicted in FIG. 2C, it should be appreciated that any road surface impediment positioned at periodic intervals (e.g., road humps, depressions, etc.) may produce similar periodic perturbations in the schematic representation 246 of the baseline vibrational signature 242.

Referring again to the example method 300, at block 310 of the method 300, the vibration monitoring module 106 may determine a vibrational signature for the vehicle based at least in part on the real-time sensor data 104. As previously noted, the real-time sensor data 104 may include any form of data indicative of vibrational characteristics of the vehicle as it traverses a particular road segment. Such data may include, without limitation, sensor data from one or more IMUs (or components thereof such as accelerometers, gyroscopes, magnetometers, etc.), audio data captured by one or more microphones, or the like. The vibrational signature for the vehicle may be capable of being represented in a similar manner as the schematic representation of baseline vibrational signatures depicted in FIGS. 2A-2C. In particular, the vibrational signature for the vehicle may be indicative of an instantaneous amount of vibration experienced by the vehicle over a period of time; changes in the instantaneous amount of vibration over the period of time; a cumulative amount of vibration experienced by the vehicle over the period of time; or the like.

At block 312 of the method 300, the vibration monitoring module 106 may determine whether the vibrational signature for the vehicle generated at block 310 deviates from the baseline vibrational signature for the road segment determined at block 308 by more than a threshold amount. In example embodiments, deviation of the vibrational signature for the vehicle from the baseline vibrational signature for the road segment being traversed by the vehicle by more than a threshold amount is indicative of unexpected anomalous vibrational characteristics of the vehicle, which may in turn, indicate potential damage to vehicular structure. If a positive determination is made at block 312—which is potentially indicative of damage to the vehicle's structure—the vibration monitoring module 106 may generate a vibration anomaly alert 118. In example embodiments, the vibration anomaly alert 118 may provide some indication of the determination at block 314 that the vibrational signature for the vehicle deviates from the baseline vibrational signature by more than the threshold amount, thereby indicating the presence of anomalous vibrational characteristics for the vehicle that may be reflective of damage to the structure of the vehicle such as its suspension system.

In example embodiments, a vibration anomaly response module 120 may receive the vibration anomaly alert 118 and initiate one or more responses to the vibration anomaly alert 118, at block 316 of the method 300. For instance, in example embodiments, the vibration anomaly response module 120 may initiate a response whereby an on-board processing unit of an AV utilizes a GPS device, and optionally third-party data such as traffic data, weather data, or the like, to identify a safe location to halt the vehicle. Once identified, the processing unit may initiate a braking operation to bring the vehicle to a stop at the determined location. In addition, in example embodiments, the vibration anomaly response module 120 may send a communication to an emergency services provider such as a police department, a fire department, an ambulatory services provider, a vehicle assistance provider (e.g., a towing service), or the like to initiate an emergency response. Upon receiving the communication (which may include an identification of a location of the vehicle), an emergency services provider may respond to the location of the vehicle to provide emergency response services which may include, for example, performing diagnostics on the vehicle to ascertain any potential vehicular damage, providing assistance to occupants of the vehicle, relocating the vehicle to another location (e.g., an automotive repair shop) for additional evaluation/diagnostics, or the like. It should be appreciated that the above examples of measures that may be taken in response to the vibrational anomaly alert 118 are merely illustrative and not exhaustive.

Figure 4:
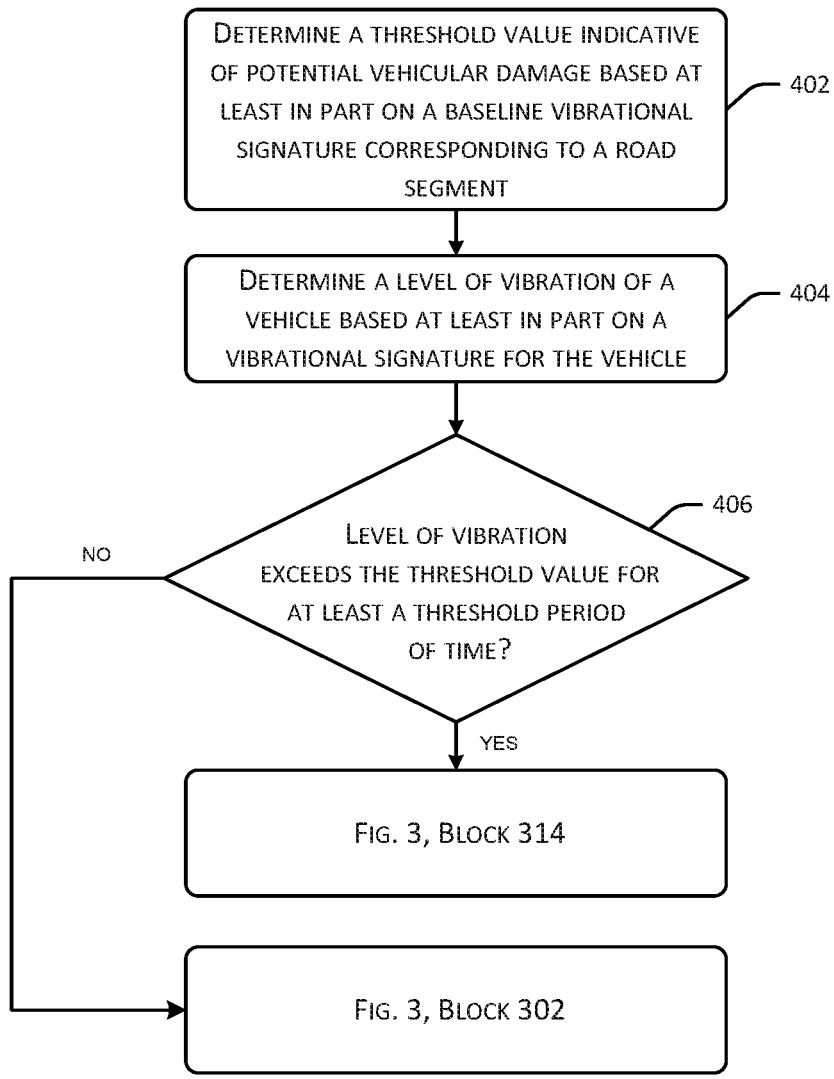
FIG. 4 is a process flow diagram of an illustrative method for determining whether a deviation between a vibrational signature for a vehicle and a baseline vibrational signature of a road segment is indicative of potential vehicular damage in accordance with an example embodiment of the invention.

FIG. 4 is a process flow diagram of an illustrative method 400 for implementing the operation at block 312 of the method 300 (the determination as to whether the vibrational signature for the vehicle deviates from the baseline vibrational signature for the road segment by more than a threshold amount). Referring now to FIG. 4, at block 402 of the method 400, the vibration monitoring module 106 may determine a threshold value indicative of potential vehicular damage based at least in part on the baseline vibrational signature for the road segment. In example embodiments, the threshold value may be correlated to the average/baseline amount of vibration represented in the baseline vibrational signature, the cumulative amount of vibration represented in the baseline vibration signature, or the like. For instance, the threshold value may be lower for the baseline vibrational signature 216 depicted in FIG. 2A as compared to the baseline vibrational signature 230 depicted in FIG. 2B due to the lower average/baseline and/or cumulative amount of vibration reflected in the baseline vibrational signature 216. Thus, in example embodiments, as the number and/or magnitude of road surface irregularities present on a road segment increases, the larger the amount of vibration reflected in the corresponding baseline vibrational signature, and thus, the larger the threshold value determined at block 402.

At block 404 of the method 400, the vibration monitoring module 106 may determine a level of vibration of the vehicle based at least in part on the vibrational signature generated for the vehicle. In example embodiments, the vibration level determined for the vehicle may be an average level of vibration over a period of time, a cumulative amount of vibration over the period of time, or any other suitable vibrational metric representative of vibrational characteristics of the vehicle as it traverses the road segment. In example embodiments, the value of the metric selected at block 404 as the vibration level of the vehicle may be derived, as previously described in connection with baseline vibrational signatures, from the vibrational signature determined for the vehicle.

At block 406 of the method 400, the vibration monitoring module 106 may determine whether the level of vibration of the vehicle (determined at block 404) exceeds the threshold value (determined at block 402) for at least a threshold period of time. In response to a positive determination at block 406, the method 400 may proceed to block 314 of the method 300, and the vibration monitoring module 106 may generate the vibration anomaly alert 118. On the other hand, in response to a negative determination at block 406—indicating that the vehicle is not exhibiting anomalous vibrational characteristics—no alert is generated, and the method 400 proceeds to block 302 of the method 300. The example method 300 can then be performed iteratively as new real-time sensor data indicative of vibrational characteristics of the vehicle is received.

In example embodiments, the threshold period of time over which the vibration level of the vehicle is to exceed the threshold value indicative of potential vehicular damage may be a predetermined period of time or a variably selectable period of time. In those example embodiments in which the threshold period of time is variably selectable, the vehicle may execute a self-learning algorithm either locally or remotely to learn the threshold period of time based on historical sensor data 110 (FIG. 1) indicative of vibrational characteristics of vehicles as they traversed the road segment currently being traversed by the vehicle whose vibrational behavior is currently being evaluated.

Figure 6:
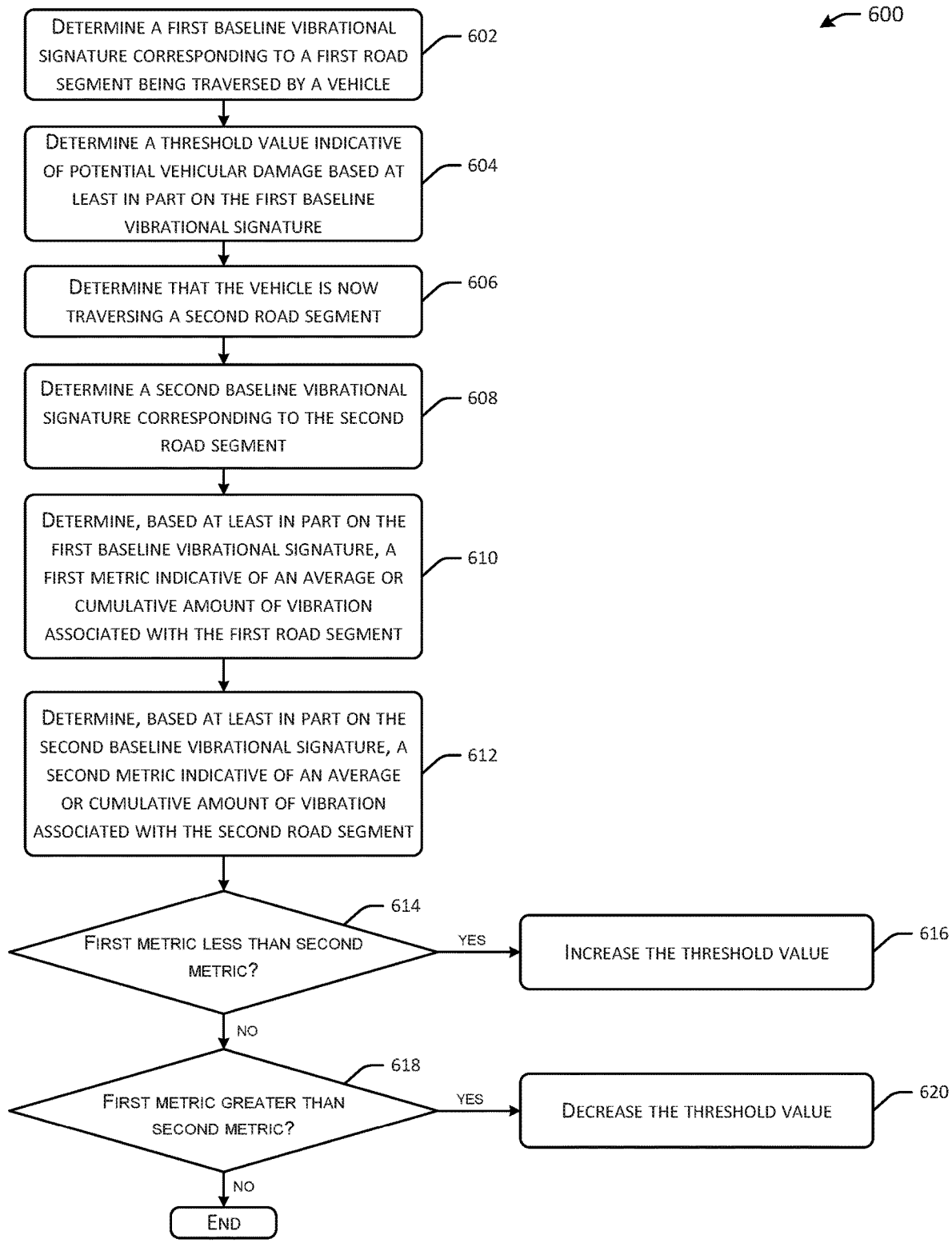
FIG. 6 is a process flow diagram of an illustrative method for adjusting a threshold value indicative of potential vehicular damage based on the different baseline vibrational signatures associated with different road segments in accordance with an example embodiment of the invention.

FIG. 6 is a process flow diagram of an illustrative method 600 for adjusting a threshold value indicative of potential vehicular damage based on the different baseline vibrational signatures associated with different road segments in accordance with an example embodiment of the invention. The threshold value that is adjusted may be the threshold value determined at block 402 of the method 400.

At block 602 of the method 600, the vibration monitoring module 106 may determine a first baseline vibrational signature corresponding to a first road segment being traversed by a vehicle. The first vibrational signature may be generated according to previously described methodologies. Then, at block 604 of the method 600, the vibration monitoring module 106 may determine a threshold value indicative of potential vehicular damage based at least in part on the first baseline vibrational signature. In example embodiments, the threshold value may be determined in accordance with the techniques described in reference to block 402 of the method 400.

At block 606 of the method 600, the vibration monitoring module 106 may determine that the vehicle is now traversing a second road segment that is different from the first road segment. For example, the vibration monitoring module 106 may leverage a GPS device on the vehicle to determine that the vehicle's location has changed from a first location on the first road segment to a second location on the second road segment. At block 608 of the method 600, the vibration monitoring module 106 may determine a second baseline vibrational signature corresponding to the second road segment. The second baseline vibrational signature may also be determined according to previously described methodologies.

At block 610 of the method 600, the vibration monitoring module 106 may determine, based at least in part on the first baseline vibrational signature, a first metric indicative of an average/baseline or cumulative amount of vibration associated with the first road segment. Similarly, at block 612 of the method 600, the vibration monitoring module 106 may determine, based at least in part on the second baseline vibrational signature, a second metric indicative of an average/baseline or cumulative amount of vibration associated with the second road segment. Each of the first metric and the second metric may be embodied, for example, in respective representations of the first and second baseline vibrational signatures, such as the schematic representations depicted in FIGS. 2A-2C.

At block 614 of the method 600, the vibration monitoring module 106 may determine whether the first metric is less than the second metric. In response to a positive determination at block 614, the vibration monitoring module 106 may increase the threshold value at block 616 of the method 600. In example embodiments, the second metric being greater than the first metric indicates that the average/baseline and/or cumulative amount of vibration experienced by vehicles on the second road segment is greater than that experienced by vehicles on the first road segment (perhaps due to a greater number and/or magnitude of road surface irregularities present on the second road segment as compared to the first road segment). As a result, the threshold value may be increased as the vehicle transitions from the first road segment to the second road segment to account for the larger expected vibration to be experienced by the vehicle on the second road segment as compared to the first road segment.

In response to a negative determination at block 614, the method 600 may proceed to block 618, where the vibration monitoring module 106 may determine whether the first metric is greater than the second metric. In response to a positive determination at block 618, the vibration monitoring module 106 may decrease the threshold value at block 620 of the method 600. In example embodiments, the first metric being greater than the second metric indicates that the average/baseline and/or cumulative amount of vibration experienced by vehicles on the first road segment is greater than that experienced by vehicles on the second road segment (perhaps due to a greater number and/or magnitude of road surface irregularities present on the first road segment as compared to the second road segment). As a result, the threshold value may be decreased as the vehicle transitions from the first road segment to the second road segment to account for the smaller expected vibration to be experienced by the vehicle on the second road segment as compared to the first road segment. In response to negative determinations at both block 614 and block 618, the threshold value may remain unchanged because the first baseline vibrational signature and the second baseline vibrational signature exhibit comparable vibrational characteristics for the first and second road segments.

Hardware Implementation

Figure 7:
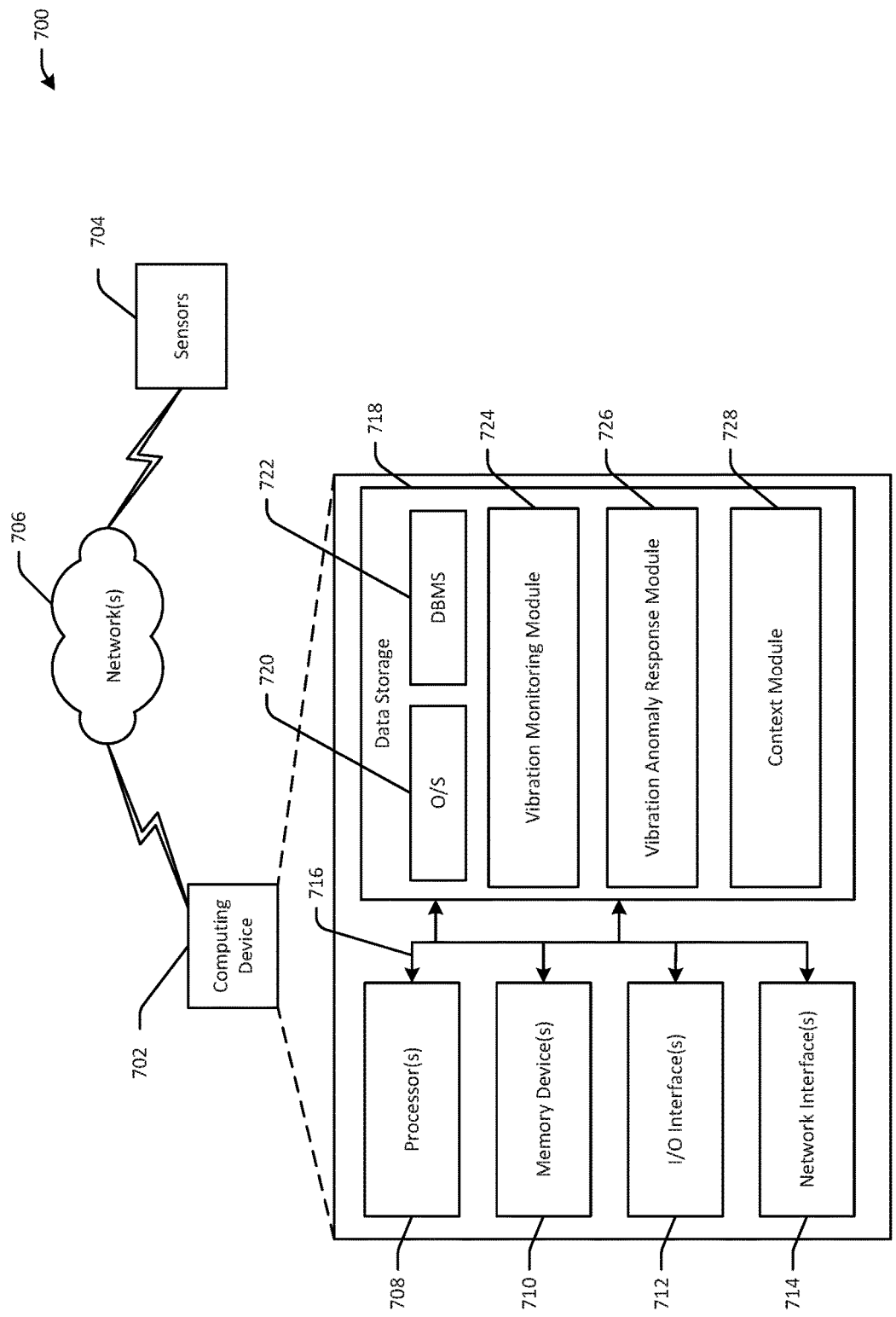
FIG. 7 is a schematic block diagram illustrating an example networked architecture configured to implement example embodiments of the invention.

FIG. 7 is a schematic block diagram illustrating an example networked architecture 700 configured to implement example embodiments of the invention. The networked architecture 700 can include one or more special-purpose computing devices 702 communicatively coupled via one or more networks 706 to various sensors 704. The sensors 704 may include any of the example types of on-board vehicle sensors previously described including, without limitation, LiDAR sensors, radars, cameras, GPS receivers, sonar-based sensors, ultrasonic sensors, IMUs, accelerometers, gyroscopes, magnetometers, FIR sensors, and so forth. In example embodiments, the sensors 704 may include on-board sensors provided on an exterior or in an interior of a vehicle such as an autonomous vehicle. However, in certain example embodiments, the sensors 704 may also include one or more fixed sensors provided in a physical environment surrounding a vehicle. The special-purpose computing device(s) 702 may include devices that are integrated with a vehicle and may receive sensor data from the sensors 704 via a local network connection (e.g., WiFi, Bluetooth, Dedicated Short Range Communication (DSRC), or the like). In other example embodiments, the special-purpose computing device(s) 702 may be provided remotely from a vehicle and may receive the sensor data from the sensors 704 via one or more long-range networks.

The special-purpose computing device(s) 702 may be hard-wired to perform the techniques described herein; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 702 may also combine custom hard-wired logic, ASICs, or FPGAs with custom programming to accomplish the techniques. The special-purpose computing device(s) 702 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 720, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 702 may be controlled by a proprietary operating system. The operating system software 720 may control and schedule computer processes for execution; perform memory management; provide file system, networking, and I/O services; and provide user interface functionality, such as a graphical user interface ("GUI").

While the computing device(s) 702 and/or the sensors 704 may be described herein in the singular, it should be appreciated that multiple instances of any such component can be provided and functionality described in connection any particular component can be distributed across multiple instances of such a component. In certain example embodiments, functionality described herein in connection with any given component of the architecture 700 can be distributed among multiple components of the architecture 700. For example, at least a portion of functionality described as being provided by a computing device 702 may be distributed among multiple such computing devices 702.

The network(s) 706 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 706 can have any suitable communication range associated therewith and can include, for example, global networks (e.g., the Internet), metropolitan area networks (MANs), wide area networks (WANs), local area networks (LANs), or personal area networks (PANs). In addition, the network(s) 706 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 702 can include one or more processors (processor(s)) 708, one or more memory devices 710 (generically referred to herein as memory 710), one or more input/output ("I/O") interface(s) 712, one or more network interfaces 714, and data storage 718. The computing device 702 can further include one or more buses 716 that functionally couple various components of the computing device 702. The computing device 702 may also include various program modules such as a vibration monitoring module 724, a vibration anomaly response module 726, and a context module 728. These program modules may be implemented in any combination of software, hardware, or firmware. While these program modules are illustratively depicted as software/firmware modules stored in the data storage 718, it should be appreciated that the program modules may include hard-wired logic, customized logic of a persistently programmed customized computing device such as an ASIC or FPGA, or the like. Each of the program modules may include logic for performing any of the processes and tasks described earlier in connection with correspondingly named program modules depicted in FIGS. 1 and 2A-2C.

The bus(es) 716 can include at least one of a system bus, a memory bus, an address bus, or a message bus, and can permit the exchange of information (e.g., data (including computer-executable code), signaling, etc.) between various components of the computing device 702. The bus(es) 716 can include, without limitation, a memory bus or a memory controller, a peripheral bus, an accelerated graphics port, and so forth. The bus(es) 716 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 710 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 710 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 710 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 718 can include removable storage and/or non-removable storage including, but not limited to, magnetic storage, optical disk storage, and/or tape storage. The data storage 718 can provide non-volatile storage of computer-executable instructions and other data. The memory 710 and the data storage 718, removable and/or non-removable, are examples of computer-readable storage media (CRSM) as that term is used herein. The data storage 718 can store computer-executable code, instructions, or the like that can be loadable into the memory 710 and executable by the processor(s) 708 to cause the processor(s) 708 to perform or initiate various operations. The data storage 718 can additionally store data that can be copied to memory 710 for use by the processor(s) 708 during the execution of the computer-executable instructions. Moreover, output data generated as a result of execution of the computer-executable instructions by the processor(s) 708 can be stored initially in memory 710 and can ultimately be copied to data storage 718 for non-volatile storage.

More specifically, the data storage 718 can store one or more operating systems (O/S) 720 and one or more database management systems (DBMS) 722 configured to access the memory 710 and/or one or more external datastore(s) (the datastore(s) 118 depicted in FIG. 1 and/or the datastore(s) 218 depicted in FIGS. 2A-2C) potentially via one or more of the networks 706. In addition, the data storage 718 may further store one or more program modules, applications, engines, computer-executable code, scripts, or the like. For instance, any of the program modules described herein may be implemented as software and/or firmware that includes computer-executable instructions (e.g., computer-executable program code) loadable into the memory 710 for execution by one or more of the processor(s) 708 to perform any of the techniques described herein.

Although not depicted in FIG. 7, the data storage 718 can further store various types of data utilized by program modules of the computing device 702. Such data may include, without limitation, sensor data, map data, vibrational signatures, threshold values, or the like. Any data stored in the data storage 718 can be loaded into the memory 710 for use by the processor(s) 708 in executing computer-executable program code. In addition, any data stored in the data storage 718 can potentially be stored in one or more external datastores that are accessible via the DBMS 722 and loadable into the memory 710 for use by the processor(s) 708 in executing computer-executable instructions/program code.

The processor(s) 708 can be configured to access the memory 710 and execute computer-executable instructions/program code loaded therein. For example, the processor(s) 708 can be configured to execute computer-executable instructions/program code of the various program modules to cause or facilitate various operations to be performed in accordance with one or more embodiments of the invention. The processor(s) 708 can include any suitable processing unit capable of accepting data as input, processing the input data in accordance with stored computer-executable instructions, and generating output data. The processor(s) 708 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 708 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 708 can be made capable of supporting any of a variety of instruction sets.

Referring now to other illustrative components depicted as being stored in the data storage 718, the 0/S 720 can be loaded from the data storage 718 into the memory 710 and can provide an interface between other application software executing on the computing device 702 and hardware resources of the computing device 702. More specifically, the 0/S 720 can include a set of computer-executable instructions for managing hardware resources of the computing device 702 and for providing common services to other application programs. In certain example embodiments, the 0/S 720 can include or otherwise control execution of one or more of the program modules stored in the data storage 718. The O/S 720 can include any operating system now known or which can be developed in the future including, but not limited to, any server operating system, any mainframe operating system, or any other proprietary or non-proprietary operating system.

The DBMS 722 can be loaded into the memory 710 and can support functionality for accessing, retrieving, storing, and/or manipulating data stored in the memory 710, data stored in the data storage 718, and/or data stored in external datastore(s). The DBMS 722 can use any of a variety of database models (e.g., relational model, object model, etc.) and can support any of a variety of query languages. The DBMS 722 can access data represented in one or more data schemas and stored in any suitable data repository. Datastore(s) that may be accessible by the computing device 702 via the DBMS 722, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 702, the input/output (I/O) interface(s) 712 can facilitate the receipt of input information by the computing device 702 from one or more I/O devices as well as the output of information from the computing device 702 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 702 or can be separate therefrom. The I/O devices can further include, for example, any number of peripheral devices such as data storage devices, printing devices, and so forth.

The I/O interface(s) 712 can also include an interface for an external peripheral device connection such as universal serial bus (USB), FireWire, Thunderbolt, Ethernet port or other connection protocol that can connect to one or more networks. The I/O interface(s) 712 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 702 can further include one or more network interfaces 714 via which the computing device 702 can communicate with any of a variety of other systems, platforms, networks, devices, and so forth. The network interface(s) 714 can enable communication, for example, with the sensors 704 and/or one or more other devices via one or more of the network(s) 706. In example embodiments, the network interface(s) 714 provide a two-way data communication coupling to one or more network links that are connected to one or more of the network(s) 706. For example, the network interface(s) 714 may include an integrated services digital network (ISDN) card, a cable modem, a satellite modem, or a modem to provide a data communication connection to a corresponding type of telephone line. As another non-limiting example, the network interface(s) 714 may include a local area network (LAN) card to provide a data communication connection to a compatible LAN (or a wide area network (WAN) component to communicate with a WAN). Wireless links may also be implemented. In any such implementation, the network interface(s) 714 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 704 and the signals on network links and through the network interface(s) 714, which carry the digital data to and from the computing device 702, are example forms of transmission media. In example embodiments, the computing device 702 can send messages and receive data, including program code, through the network(s) 706, network links, and network interface(s) 714. For instance, in the Internet example, a server might transmit a requested code for an application program through the Internet, the ISP, a local network, and a network interface 714. The received code may be executed by a processor 708 as it is received, and/or stored in the data storage 718, or other non-volatile storage for later execution.

It should be appreciated that the program modules depicted in FIG. 7 as part of the computing device 702 are merely illustrative and not exhaustive and that processing described as being supported by any particular engine/component can alternatively be distributed across multiple engines, components, modules, or the like, or performed by a different engine, component, module, or the like. In addition, various program module(s), engine(s), script(s), plug-in(s), Application Programming Interface(s) (API(s)), or any other suitable computer-executable code hosted locally on the computing device 702 and/or hosted on other computing device(s) (e.g., a sensor 704) accessible via one or more of the network(s) 706, can be provided to support functionality provided by the engines/components depicted in FIG. 7 and/or additional or alternate functionality. Further, functionality can be modularized in any suitable manner such that processing described as being performed by a particular program module can be performed by a collection of any number of engines, components, program modules, or the like, or functionality described as being supported by any particular program module can be supported, at least in part, by another engine, component, or program module. In addition, program modules that support functionality described herein can be executable across any number of computing devices 702 in accordance with any suitable computing model such as, for example, a client-server model, a peer-to-peer model, and so forth. In addition, any of the functionality described as being supported by any of the program modules depicted in FIG. 7 can be implemented, at least partially, in hardware and/or firmware across any number of devices or servers.

It should further be appreciated that the computing device 702 can include alternate and/or additional hardware, software, or firmware components beyond those described or depicted without departing from the scope of the invention. More particularly, it should be appreciated that software, firmware, or hardware components depicted as forming part of the computing device 702 are merely illustrative and that some components may or may not be present or additional components can be provided in various embodiments. It should further be appreciated that each of the above-mentioned program modules represent, in various embodiments, a logical partitioning of supported functionality. This logical partitioning is depicted for ease of explanation of the functionality and may or may not be representative of the structure of software, hardware, and/or firmware for implementing the functionality. Accordingly, it should be appreciated that functionality described as being provided by a particular program module can, in various embodiments, be provided at least in part by one or more other engines, components, or program modules. Further, one or more depicted program modules may or may not be present in certain embodiments, while in other embodiments, additional program modules not depicted can be present and can support at least a portion of the described functionality and/or additional functionality.

In general, the terms program module or engine or the like, as used herein, refer to logic embodied in hardware or firmware, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors.

It will be appreciated that an "engine," "program module," "system," "datastore," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

Example embodiments are described herein as including logic or a number of program modules. Program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may comprise non-volatile media and/or volatile media. A non-exhaustive list of more specific examples of the computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from with transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory, however, can operate in conjunction with transmission media. In particular, transmission media participates in transferring information between non-transitory media. For example, transmission media includes coaxial cables, copper wire and fiber optics, including the wires that comprise at least some of the bus(es) 716. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for automated determination of potential vehicular damage, comprising:
   receiving real-time sensor data from one or more on-board sensors of a vehicle, the on-board sensors comprising an inertial measurement unit (IMU), the real-time sensor data being indicative of vibrational characteristics of the vehicle during operation;
   determining a vibrational signature for the vehicle based at least in part on the real-time sensor data;
   determining a baseline vibrational signature based on aggregated vibrational data from vehicles;
   determining that the vehicle is currently traversing a second road segment different from a previously traversed first road segment, wherein the baseline vibrational signature comprises a first baseline vibrational signature corresponding to the first road segment;
   determining a threshold value indicative of potential vehicular damage based at least in part on the baseline vibrational signature;
   determining a second baseline vibrational signature corresponding to the second road segment;
   determining, based at least in part on the first baseline vibrational signature, a first metric indicative of an average or cumulative amount of vibration associated with the first road segment;
   determining, based at least in part on the second baseline vibrational signature, a second metric indicative of an average or cumulative amount of vibration associated with the second road segment;
   determining, based at least in part on a comparison of the first metric and the second metric, that the average or cumulative amount of vibration associated with the second road segment is greater than the average or cumulative amount of vibration associated with the first road segment;
   in response to determining that the average or cumulative amount of vibration associated with the second road segment is greater than the average or cumulative amount of vibration associated with the first road segment, increasing the threshold value indicative of the potential vehicular damage;

generating a vibrational anomaly alert responsive, at least in part, to determining that the vibrational signature for the vehicle exceeds the threshold value; and initiating a response to the vibrational anomaly alert, wherein the response comprises:
 determining a location within a predetermined proximity of a current location of the vehicle at which to halt the vehicle and initiating a braking operation to halt the vehicle at the location; or
 sending a communication to a remote third-party emergency assistance provider.

2. The computer-implemented method of claim 1, wherein the second baseline vibrational signature is based on map data corresponding to the second road segment.

3. The computer-implemented method of claim 1, further comprising:
 storing the baseline vibrational signature in association with map data corresponding to the road segment.

4. The computer-implemented method of claim 1, wherein the one or more on-board sensors of the vehicle comprise a microphone.

5. A system for automated determination of potential vehicular damage, comprising:
 at least one processor; and
 at least one memory storing computer-executable instructions, wherein the at least one processor is configured to access the at least one processor and execute the computer-executable instructions to:
  receive real-time sensor data from one or more on-board sensors of a vehicle, the on-board sensors comprising an inertial measurement unit (IMU), the real-time sensor data being indicative of vibrational characteristics of the vehicle during operation;
  determine a road segment currently being traversed by the vehicle;
  determine a baseline vibrational signature corresponding to the road segment based on aggregated vibrational data from vehicles;
  determine a vibrational signature for the vehicle based at least in part on the real-time sensor data;
  determine that the vehicle is currently traversing a second road segment different from a previously traversed first road segment, wherein the baseline vibrational signature comprises a first baseline vibrational signature corresponding to the first road segment;
  determine a threshold value indicative of potential vehicular damage based at least in part on the baseline vibrational signature;
  determine a second baseline vibrational signature corresponding to the second road segment;
  determine, based at least in part on the first baseline vibrational signature, a first metric indicative of an average or cumulative amount of vibration associated with the first road segment;
  determine, based at least in part on the second baseline vibrational signature, a second metric indicative of an average or cumulative amount of vibration associated with the second road segment;
  determine, based at least in part on a comparison of the first metric and the second metric, that the average or cumulative amount of vibration associated with the second road segment is greater than the average or cumulative amount of vibration associated with the first road segment;
  in response to determining that the average or cumulative amount of vibration associated with the second road segment is greater than the average or cumulative amount of vibration associated with the first road segment, increase the threshold value indicative of the potential vehicular damage;
  generate a vibrational anomaly alert responsive, at least in part, to determining that the vibrational signature for the vehicle exceeds the threshold value; and
  initiate a response to the vibrational anomaly alert, wherein the response comprises:
   determining a location within a predetermined proximity of a current location of the vehicle at which to halt the vehicle and initiating a braking operation to halt the vehicle at the location; or
   sending a communication to a remote third-party emergency assistance provider.

6. The system of claim 5, wherein the second baseline vibrational signature is based on map data corresponding to the second road segment.

7. The system of claim 5, wherein the at least one processor is further configured to execute the computer-executable instructions to:
 store the baseline vibrational signature in association with map data corresponding to the road segment.

8. The system of claim 5, wherein the one or more on-board sensors of the vehicle comprise a microphone.

9. A computer program product for automated determination of potential vehicular damage, the computer program product comprising a non-transitory computer-readable medium readable by a processing circuit, the non-transitory computer-readable medium storing instructions executable by the processing circuit to cause a method to be performed, the method comprising:
 receiving real-time sensor data from one or more on-board sensors of a vehicle, the on-board sensors comprising an inertial measurement unit (IMU), the real-time sensor data being indicative of vibrational characteristics of the vehicle during operation;
 determining a vibrational signature for the vehicle based at least in part on the real-time sensor data;
 determining a baseline vibrational signature based on aggregated vibrational data from vehicles;
 determining that the vehicle is currently traversing a second road segment different from a previously traversed first road segment, wherein the baseline vibrational signature comprises a first baseline vibrational signature corresponding to the first road segment;
 determining a threshold value indicative of potential vehicular damage based at least in part on the baseline vibrational signature;
 determining a second baseline vibrational signature corresponding to the second road segment;
 determining, based at least in part on the first baseline vibrational signature, a first metric indicative of an average or cumulative amount of vibration associated with the first road segment;
 determining, based at least in part on the second baseline vibrational signature, a second metric indicative of an average or cumulative amount of vibration associated with the second road segment;
 determining, based at least in part on a comparison of the first metric and the second metric, that the average or cumulative amount of vibration associated with the second road segment is greater than the average or cumulative amount of vibration associated with the first road segment;
 in response to determining that the average or cumulative amount of vibration associated with the second road segment is greater than the average or cumulative amount of vibration associated with the first road segment, increasing the threshold value indicative of the potential vehicular damage;

generating a vibrational anomaly alert responsive, at least in part, to determining that the vibrational signature for the vehicle exceeds the threshold value; and initiating a response to the vibrational anomaly alert, wherein the response comprises:
- determining a location within a predetermined proximity of a current location of the vehicle at which to halt the vehicle and initiating a braking operation to halt the vehicle at the location; or
- sending a communication to a remote third-party emergency assistance provider.

10. The computer-implemented method of claim 1, further comprising:

determining damage to a suspension of the vehicle in response to determining that the vibrational signature for the vehicle deviates from a baseline vibrational signature by more than a threshold amount; and the performing additional diagnostics on the vehicle comprises verifying the damage to the suspension.

11. The computer-implemented method of claim 1, wherein the vibrational signature indicates a change in an instantaneous vibration of the vehicle over a period of time.

12. The computer-implemented method of claim 1, wherein the on-board sensors comprise one or more accelerometers, gyroscopes, magnetometers, and microphones.

13. The computer-implemented method of claim 1, wherein the vibrational signature comprises a vibrational frequency of the vehicle.

* * * * *